April 2, 1957 E. H. SCHULTZ, JR 2,787,165
PULLEY WITH OIL RESERVOIR
Filed May 14, 1954
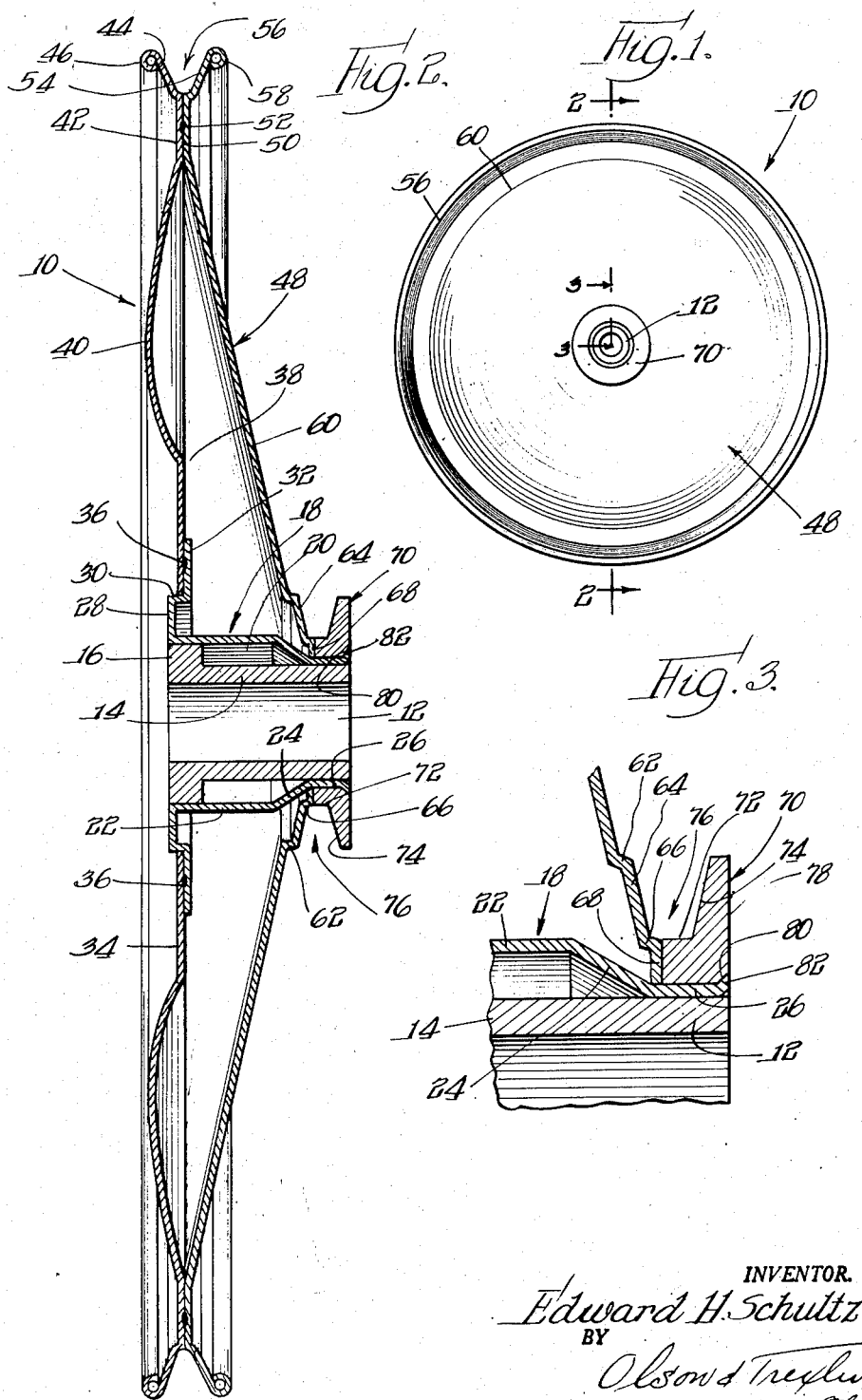
INVENTOR.
Edward H. Schultz Jr.
BY
Olson & Trexler
Attys

United States Patent Office 2,787,165
Patented Apr. 2, 1957

2,787,165

PULLEY WITH OIL RESERVOIR

Edward H. Schultz, Jr., Chicago, Ill., assignor to The Nagel-Chase Mfg. Co., Chicago, Ill., a corporation of Illinois Application May 14, 1954, Serial No. 429,797

6 Claims. (Cl. 74—230.3)

This invention is concerned generally with a pulley wheel or sheave, and more particularly with a step pulley having a common sheet metal member forming a part of two pulley grooves, and further having a built-in oil reservoir wherein the shell of the oil reservoir maintains the parts in assembled relation.

Step pulleys, i. e., pulleys having two or more belt receiving grooves of different diameters, are well known in the art for speed changing. Such pulleys sometimes have been made of cast metal, but cast pulleys often are expensive to make to satisfactory tolerances, and also possess too much inertia. Accordingly, such pulleys preferably are made of sheet metal. However, certain problems are encountered in the use of sheet material. When the parts are riveted or spot welded together as generally has been the case in the prior art, shock loads imposed on the pulley have tended to shear the rivets or spot welds. It will be appreciated that the relatively sharp edges presented by sheet metal present a much greater problem regarding the shearing of rivets than is presented by pulleys made of other materials. In my co-pending application entitled "Step Pulley," Serial No. 285,118, filed April 30, 1952, now Patent No. 2,738,681, I have disclosed an improved step pulley made of sheet material wherein a common sheet member forms parts of two pulley grooves. Thus, rotative forces are delivered from one belt to another through a common member and there is no possibility of shearing any attaching rivets or spot welds. This invention represents an improvement over my aforesaid co-pending application.

It is an object of this invention to provide an improved pulley of the foregoing character having a built-in oil reservoir for lifetime lubrication of the pulley bearing.

More particularly, it is an object of this invention to provide a pulley having a built-in oil reservoir wherein the parts of the pulley are mounted on and held together by the shell of the oil reservoir.

Another object of this invention is to provide a step pulley having a common sheet metal drive member forming parts of two different belt grooves, wherein the inner edge of this common member is not positively fastened in place, but rather is limited in movement in a particular direction and is wedged into such limiting position by a strutting action.

Yet another object of this invention is to provide an improved sheet metal step pulley having a cast or machined end pulley piece facilitating mounting of the pulley parts on a common member.

Other and further objects and advantages of the present invention will be apparent from the following description when taken in connection with the accompanying drawings wherein:

Fig. 1 is an end view of a step pulley constructed in accordance with the principles of my invention;

Fig. 2 is a diametrical sectional view taken substantially along the line 2—2 of Fig. 1; and Fig. 3 is a fragmentary sectional view on a greatly enlarged scale taken along the line 3—3 of Fig. 1.

Referring now in greater particularity to the figures, there will be seen a pulley generally indicated by the numeral 10. This pulley comprises a porous bronze sleeve or bushing 12 having a cylindrical portion 14 and a radially extending, peripheral flange 16 at one end. Porous bronze for use in bearings is well known and such metal usually is made by sintering powdered metal. A shell 18 is placed over the porous bronze bushing and forms therewith an oil reservoir 20 which is filled with oil during manufacture of the pulley. The oil then works through the porous bronze to the inner bearing surface of the bushing to maintain the same lubricated throughout a long service life.

The shell 18 preferably is formed of sheet metal and comprises a cylindrical portion 22 fitting tightly about the flange 16 of the bushing and spaced from the cylindrical portion 14 of the bushing. The shell is provided with a conical portion 24 which is integral with the cylindrical section 22, and which continues further as a smaller cylindrical section 26 fitting tightly about the porous bronze bushing 14. It will be appreciated that the shell 18 thus is held on the bushing by a press fit without the necessity of any fasteners or brazing, and that any such further fastening is unnecessary inasmuch as substantially the only forces acting on the pulley will be radial and rotary, and that as a general rule there will be no axial thrust on the pulley.

At the end of the larger cylindrical portion 22, the shell 18 is provided with a radially outwardly directed flange 28 which terminates in an integral offset cylindrical portion 40 of short axial extent and directed in the same direction as the cylindrical portion 22. This last named cylindrical portion 30 terminates in a further radially outwardly extending peripheral flange 32. All of the foregoing parts of the shell are integral, and the shell forms the mounting for the remaining parts of the pulley as hereinafter will be brought out.

The step pulley 10 further includes a sheet metal end piece 34 which fits snugly around the cylindrical portion 30 and is secured to the flange 32 by means such as spot welds 36. The end piece 34 extends radially outwardly as a flat section from the cylindrical section 30 to a point 38 at which it is formed into a bulging or bowed shape 40 to impart strength to the pulley. The bowed section is integral with the inner portion of the sheet 34, and at its outer periphery joins integrally with a flat ring-like section 42. At the outer edge of the ring-like section 42 the material is deflected diagonally outwardly as indicated at 44 to form one-half of a pulley V-groove, the material being rolled over at 46 at the extreme outer edge to impart strength thereto.

The step pulley 10 further includes a common sheet metal member designated by the numeral 48. This sheet metal member includes a ring-like section 50 near its outer edge held flat against the ring-like section 42 by means such as spot welds 52. Outwardly of the ring-like section 50, the common member 48 is diagonally directed outwardly at 54 to form with the section 44 an outer or a larger pulley receiving V-groove 56. The outer edge of the section 54 is rolled over at 58 for increased strength.

The common member 48 extends diagonally inwardly at 60 in the form of a shallow cone from the ring-like section 50 to a step 62 forming a short, cylindrical section which again is directed inwardly in a surface 64 generally parallel to the surface 60 to form half of a smaller pulley V-groove. The surface 64 is completed by a shoulder 66 and a radially inwardly directed flange or surface 68 which encircles the shell 18 of the oil reservoir substantially at the junction of the conical portion 24 and small cylindrical portion 26 thereof.

The step pulley 10 is completed by a cast or machined solid end piece 70. The end piece is provided with a cylindrical surface 72 and a surface 74 flaring conically outwardly therefrom to form with the surface 64 an inner or smaller pulley V-groove 76. The end piece 70 fits snugly about the shell 18 and is provided at the inner edge of its outer, flat face 78 with a beveled or chamfered portion 80. The end of the shell 18 is swaged or spun outwardly into this chamfered portion as indicated at 82, thereby containing the end piece 70 on the shell and holding it against the inner section 68 of the common piece 48.

It now will be apparent that the sheet metal shell 18 forms with the sleeve 12 a rotary base structure upon which the other parts of the pulley are mounted. The securing of the end pieces 34 and 70 thereon more or less traps the common piece 48. The common piece 48 is held to the end piece 34 by the spot welds 52. Any forces imposed on the outer V-groove 56 by a pulley belt push inwardly on the common piece 48, and its conical arrangement causes it to act as a strut to force the inner section 68 thereof more tightly into the corner between the metal shell 18 and the solid end piece 70. This allows the inner edge 68 to be mounted on the shell without requiring welding or other positive fastening means thereto. It will be apparent that the solid end piece and the spinning of the shell against the beveled surface thereof provides for anchoring the common piece 48 in a most efficacious manner.

The lack of fastening members necessary in my improved step pulley materially speeds and facilitates production of the pulley. The spot welds can be held to a minimum due to the resolution of forces relied upon by applicant to wedge the common member in place, and the lack of end thrust makes positive fastening of the sheet metal shell 18 to the porous bronze bushing 12 unnecessary.

It will be understood that the use of the term "sheet metal" throughout the specification is exemplary. In certain instances other sheet materials might be used, such as plastics for electrical insulation or when small forces are to be encountered. The term "sheet metal" has been used by way of example as it is contemplated that this is the sheet material that will be used most generally. Similarly, it is contemplated that porous bronze will generally form the bearing material through which oil travels from the reservoir, but it is also contemplated that other suitable materials might be used for this purpose. Likewise, the solid end piece may be of some material other than metal, although metal is believed to be the most common example.

The conical shape of the shell portion 24 will be seen to insure wedging of the inner edge portion 68 against the end piece 70 without positively restraining or locating the common part 48 on the inside of the cone. Further, it will be observed that the shoulder formed by the cylindrical portion 30 provides a positive stop against inward movement of the end piece 34. Since there is substantially no rotative force transmitted by the piece 34, and inward movement is precluded by the aforesaid shoulder, there are substantially no forces tending to shear the spot welds 36.

Various additional changes in structure will no doubt occur to those skilled in the art and are to be understood as forming a part of my invention insofar as they fall within the spirit and scope of the appended claims.

I claim:

1. A step pulley comprising rotary base means, a sheet material shell encircling said base means and forming therewith a reservoir for lubricant, a pair of substantially circular sheet material members supported by said shell and relatively diverging outwardly adjacent their peripheries to form a pulley groove of relatively large diameter, means holding said sheet material members together inwardly of the relatively diverging portions, one of said members being substantially conical inwardly of said holding means and having an inner edge section forming a part of a pulley groove of relatively small diameter, said one member acting as a force transmitting member between said pulley grooves, and a member secured on said shell and having a section cooperable with said inner edge section to form said pulley groove of relatively small diameter and further providing a stop preventing movement of said inner edge section axially of said base means as a result of strutting action of said conical portion.

2. A step pulley as set forth in claim 1 wherein the last mentioned member is secured on said shell by an outwardly flared section at the end of said shell.

3. A step pulley comprising rotary base means, a sheet material shell on said rotary base means and forming therewith a reservoir for lubricant, said base means being substantially cylindrical and having a radially outwardly directed flange at one end, said sheet material shell having a cylindrical portion tightly encircling said flange and projecting axially beyond said flange encircling said cylindrical base means portion and spaced outwardly therefrom, and said sheet material shell further having an integral substantially conical section tapering from said cylindrical section into surface of the cylindrical portion of the base means and snugly fitting about said cylindrical portion of said base means, a pair of substantially circular sheet material members supported by said sheet material shell and relatively diverging outwardly adjacent their peripheries to form a pulley groove of relatively large diameter, means holding said sheet material members together inwardly of the relatively diverging portions, one of said sheet material members being substantially conical inwardly of said holding means and having a section at its inner edge forming a part of a pulley groove of relatively small diameter, said one member acting as a force transmitting member between said pulley grooves, and an additional member secured about said sheet material shell and cooperating with said inner edge section to form said pulley groove of relatively small diameter.

4. A pulley comprising a rotary bearing pervious to lubricant, a sheet material shell encircling said bearing and fitting snugly thereon at axially spaced apart positions, said sheet material shell and bearing together forming a lubricant reservoir, and a pair of substantially circular sheet material members supported by said sheet material shell, said substantially circular sheet material members diverging outwardly adjacent their peripheries to form a pulley groove, and means holding said substantially circular sheet material members inwardly of the relatively diverging portions, said members being spaced farther apart at their inner edges on said sheet material shell than they are spaced apart adjacent said holding means.

5. A pulley as set forth in claim 4 wherein the bearing comprises an elongated cylindrical member having a radially projecting peripheral flange adjacent one end, and said sheet material shell comprises a substantially cylindrical portion snugly encircling said flange and projecting axially beyond said flange about the cylindrical portion of said bearing and spaced radially therefrom, a section extending conically inwardly from the cylindrical section of said shell, and a cylindrical section extending axially from said conical section and snugly encircling the cylindrical portion of said bearing.

6. A step pulley comprising a rotary base structure, a pair of substantially circular sheet material members supported by said base structure and relatively diverging outwardly adjacent their peripheries to form a pulley V-groove of relatively large diameter, means securing said sheet material members together inwardly of the relatively diverging portions, said sheet material members also diverging inwardly from the securing means, one of said substantially circular sheet material members having a flaring portion adjacent its inner edge portion forming a part of a pulley V-groove of relatively small diameter, the inner edge portion of said one member being mounted on said base structure adjacent one end thereof and in abutting engagement therewith to prevent relative axial movement thereon in one direction, and a solid end piece provided with a flaring surface to form with said flaring portion said pulley V-groove of relatively small diameter and having a hub-like portion of greater axial extent than the thickness of the adjacent sheet material member, said hub-like portion being fixedly mounted on the base structure and provided with a radially extending surface abutting the inner edge portion of the said one member to prevent relatively axial movement thereof in the opposite direction.

References Cited in the file of this patent

UNITED STATES PATENTS

| | | |
|---|---|---|
| 501,228 | Jantz | July 11, 1893 |
| 1,976,025 | Knudsen | Oct. 9, 1934 |
| 2,337,308 | Buote | Dec. 21, 1943 |
| 2,564,132 | Scott | Aug. 14, 1951 |
| 2,738,681 | Schultz | Mar. 20, 1956 |

FOREIGN PATENTS

| | | |
|---|---|---|
| 19,611 | Great Britain | 1914 |